US012768699B2

(12) United States Patent
Wang et al.

(10) Patent No.: US 12,768,699 B2
(45) Date of Patent: Oct. 20, 2026

(54) CONTINUOUS LIQUID LEVEL SENSING SYSTEM UTILIZING PROJECTED CAPACITANCE

(71) Applicant: Weida Hi-tech Corporation Ltd., Hsinchu City (TW)

(72) Inventors: Jen-Chuan Wang, Hsinchu City (TW); Zi-Huan Luo, Taoyuan City (TW); Shih-Ming Wu, Taoyuan City (TW)

(73) Assignee: WEIDA HI-TECH CORPORATION LTD., Hsinchu City (TW)

( * ) Notice: Subject to any disclaimer, the term of this patent is extended or adjusted under 35 U.S.C. 154(b) by 282 days.

(21) Appl. No.: 18/763,767

(22) Filed: Jul. 3, 2024

(65) Prior Publication Data

US 2025/0012616 A1 Jan. 9, 2025

(30) Foreign Application Priority Data

Jul. 6, 2023 (TW) ................................. 112125320

(51) Int. Cl.
*G01F 23/263* (2022.01)
*G01F 25/20* (2022.01)

(52) U.S. Cl.
CPC ............ *G01F 23/268* (2013.01); *G01F 25/20* (2022.01)

(58) Field of Classification Search
CPC .... G01F 23/268; G01F 23/266; G01F 23/263; G01F 23/292; G01F 23/265; G01F 25/20; G01F 23/26; G01F 23/2962; G01F 23/00; G01F 23/22; G01F 23/296; G01F 23/284; G01F 23/14; G01F 23/24; G01F 23/72; G01F 23/242; G01F 23/38; G01F 23/74; G01F 23/2968; G01F 23/2967; G01F 23/247; G01F 23/246; G01F 23/80; G01F 1/74; G01F 23/241; G01F 23/18;
(Continued)

(56) References Cited

U.S. PATENT DOCUMENTS 10,371,555 B2 * 8/2019 Philipson .............. G01F 23/266
11,169,015 B2 * 11/2021 Lo ......................... G01F 23/265
(Continued)

FOREIGN PATENT DOCUMENTS

CN 105136246 A 12/2015
CN 110274660 A 9/2019
(Continued)

*Primary Examiner* — Andre J Allen
(74) *Attorney, Agent, or Firm* — Muncy, Geissler, Olds & Lowe, P.C.

(57) ABSTRACT

A continuous liquid level sensing system utilizing projected capacitance includes: a liquid contact layer, which has at least one surface for contacting a liquid and separates the liquid to generate a space that is dry; and a projected capacitance unit being disposed in the space and having a first capacitance value that is preset, wherein the projected capacitance unit does not directly contact the liquid, and the projected capacitance unit contacts the liquid contact layer, wherein when the liquid contact layer changes a preset electric field of the projected capacitance unit after contacting the liquid, the first capacitance value is changed to a second capacitance value; and a control device calculating a liquid level height of the liquid according to a change between the first capacitance value and the second capacitance value.

10 Claims, 12 Drawing Sheets

(58) Field of Classification Search

CPC .. G01F 23/0007; G01F 23/36; G01F 23/2961; G01F 15/14; G01F 1/6845; G01F 1/662; G01F 1/667; G01F 23/248; G01F 23/2921; G01F 23/804; G01F 23/243; G01F 23/68; G01F 23/76; G01F 25/10; G01F 1/684; G01F 23/2925; G01F 15/18; G01F 1/696; G01F 23/2927; G01F 23/2922; G01F 23/30; G01F 1/6842; G01F 23/2965; G01F 23/802; G01F 1/56; G01F 1/692; G01F 1/6847; G01F 1/6888; G01F 23/261; G01F 23/363; G01F 22/00; G01F 23/2928; G01F 1/69; G01F 23/2966; G01F 23/164; G01F 1/66; G01F 1/34; G01F 23/62; G01F 23/32; G01F 25/24; G01F 23/04; G01F 23/20; G01F 1/68; G01F 5/00; G01F 23/28; G01F 1/28; G01F 23/64; G01F 15/006; G01F 1/688; G01F 23/02; G01F 1/698; G01F 15/00; G01F 23/70; G01F 23/60; G01F 1/8413; G01F 23/0038; G01F 1/363; G01F 15/066; G01F 23/0023; G01F 15/024; G01F 1/6965; G01F 15/005; G01F 23/2845; G01F 1/666; G01F 1/8661; G01F 15/022; G01F 22/02; G01F 1/00; G01F 23/0046; G01F 15/063; G01F 1/712; G01F 1/7806; G01F 1/002; G01F 1/58; G01F 1/60; G01F 1/8477; G01F 23/168; G01F 1/7082; G01F 1/86; G01F 15/02; G01F 1/20; G01F 1/588; G01F 1/708; G01F 1/8409; G01F 17/00; G01F 1/6986; G01F 23/161; G01F 23/2924; G01F 1/7084; G01F 23/162; G01F 23/2963; G01F 15/185; G01F 23/16; G01F 25/00; G01F 1/383; G01F 1/42; G01F 23/185; G01F 1/76; G01F 23/165; G01F 1/8436; G01F 1/64; G01F 1/584; G01F 1/668; G01F 1/84; G01F 1/8472; G01F 1/663; G01F 23/244; G01F 1/3266; G01F 23/245; G01F 1/46; G01F 15/06; G01F 1/36; G01F 15/0755; G01F 1/40; G01F 1/699; G01F 11/029; G01F 23/0015; G01F 1/8427; G01F 23/44; G01F 23/56; G01F 7/00; G01F 23/46; G01F 1/24; G01F 1/44; G01F 1/849; G01F 23/683; G01F 23/686; G01F 1/3209; G01F 23/303; G01F 1/007; G01F 1/6882; G01F 1/704; G01F 13/006; G01F 1/8422; G01F 13/00; G01F 1/8431; G01F 11/027; G01F 25/22; G01F 23/282; G01F 23/706; G01F 9/001; G01F 1/115; G01F 1/38; G01F 23/003; G01F 15/08; G01F 1/32; G01F 25/0084; G01F 1/50; G01F 1/52; G01F 1/8404; G01F 23/54; G01F 1/3218; G01F 1/7044; G01F 1/8418; G01F 1/8445

See application file for complete search history.

(56) References Cited

U.S. PATENT DOCUMENTS

| | | | | |
|---|---|---|---|---|
| 11,397,103 | B2 * | 7/2022 | Claes | G01N 27/22 |
| 2018/0058896 | A1 * | 3/2018 | Lo | G01F 23/263 |

FOREIGN PATENT DOCUMENTS

| | | | | |
|---|---|---|---|---|
| CN | 112484810 | A | | 3/2021 |
| CN | 215491959 | U | | 1/2022 |
| JP | 2952371 | B2 | * | 9/1999 |
| JP | 2004205445 | A | * | 7/2004 |
| JP | 2007298362 | A | * | 11/2007 |

* cited by examiner

100A

CONTINUOUS LIQUID LEVEL SENSING SYSTEM UTILIZING PROJECTED CAPACITANCE

CROSS-REFERENCE TO RELATED APPLICATIONS

This application claims priority of No. 112125320 filed in Taiwan R.O.C. on Jul. 6, 2023, the entire content of which is hereby incorporated by reference.

FIELD OF THE INVENTION

This disclosure relates to a liquid level sensing system, and more particularly to a liquid level sensing system utilizing projected capacitance and having continuous liquid level sensing functions.

DESCRIPTION OF RELATED ART

At present, a conventional resistive liquid level gauge works according to an output resistance changing with a liquid level, wherein the output resistance is inversely proportional to the liquid level height. For example, the lower liquid level corresponds to the higher output resistance; and the higher liquid level corresponds to the lower output resistance. The drawback thereof is that an internal circuit of the resistive liquid level gauge needs to directly contact the liquid, and the circuit tends to be damaged. In addition, the capacitor of the capacitive liquid level gauge is a capacitor to ground, pertains to the self capacitance circuit architecture, needs a reference capacitor or resistor, and has no continuous graduation measurement function, so the precision tends to be limited.

SUMMARY OF THE INVENTION

This disclosure provides a continuous liquid level sensing system utilizing the circuit architecture of projected capacitance.

This disclosure provides a continuous liquid level sensing system utilizing the circuit architecture of mutual capacitance.

This disclosure provides a continuous liquid level sensing system utilizing projected capacitance and having an internal circuit which needs not to directly contact a liquid.

This disclosure provides a continuous liquid level sensing system utilizing projected capacitance. The continuous liquid level sensing system includes: a liquid contact layer, which has at least one surface for contacting a liquid and separates the liquid to generate a space that is dry; and a projected capacitance unit, which is disposed in the space, has a first capacitance value that is preset, does not directly contact the liquid, and contacts the liquid contact layer, wherein when the liquid contact layer changes a preset electric field of the projected capacitance unit after contacting the liquid, the first capacitance value is changed to a second capacitance value; and a control device calculating a liquid level height of the liquid according to a change between the first capacitance value and the second capacitance value.

According to an embodiment of this disclosure, the projected capacitance unit is not disposed in a region where the liquid is located, or the liquid contact layer is disposed to contact an outer wall of a storage container.

According to an embodiment of this disclosure, the projected capacitance unit is disposed in a region where the liquid is located, the liquid contact layer surrounds and covers the projected capacitance unit, and blocks the liquid from contacting the projected capacitance unit, and the liquid contact layer is disposed on an inner portion of a storage container.

According to an embodiment of this disclosure, the liquid contact layer is disposed on an inner wall of a storage container for accommodating the liquid, and the projected capacitance unit is disposed in the storage container.

DETAILED DESCRIPTION OF THE INVENTION

Figure 1A:
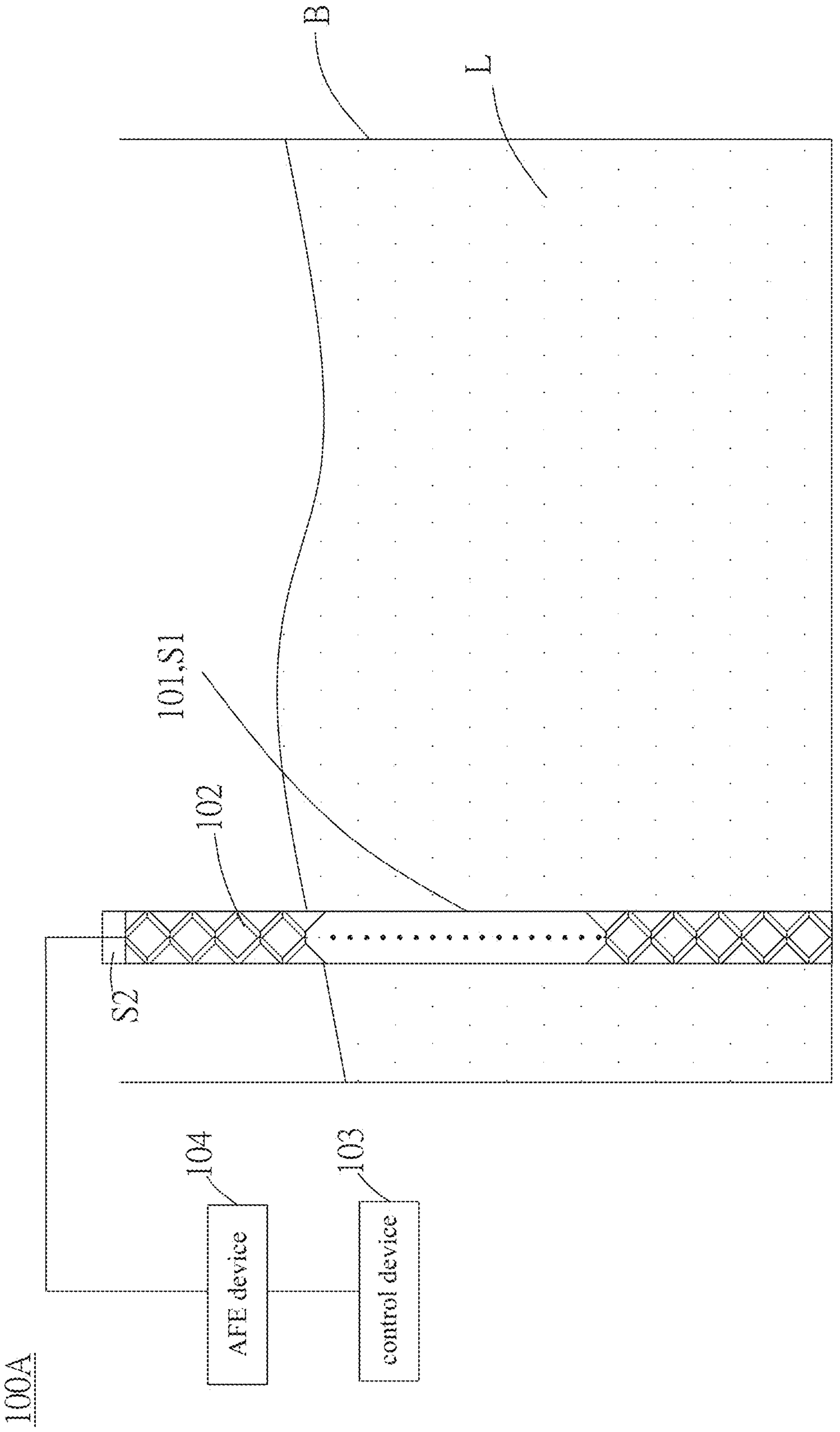
FIGS. 1A to 1F are schematic views showing an embodiment of this disclosure.
Figure 1B:
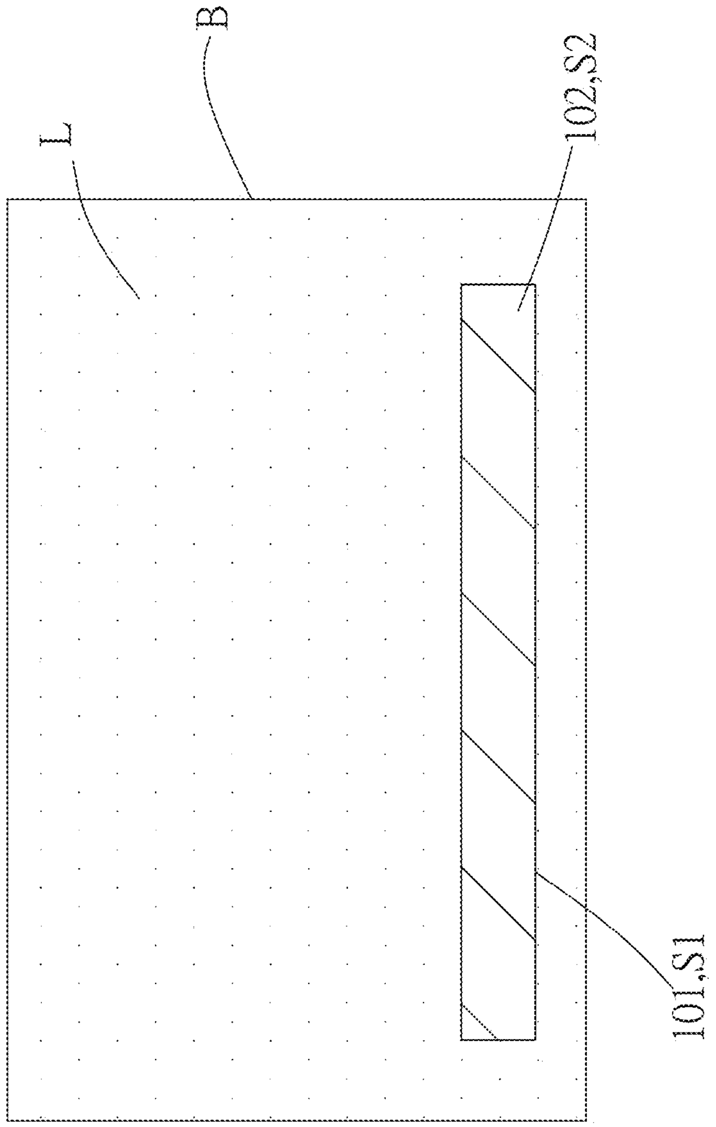

FIG. 1A is a schematic view showing an embodiment of this disclosure. FIG. 1B show a top view of FIG. 1A. Referring to FIGS. 1A and 1B, a continuous liquid level sensing system 100A utilizing projected capacitance according to this disclosure includes a liquid contact layer 101, a projected capacitance unit 102, a control device 103, and an analog front end (AFE) device 104, wherein a storage container B stores a liquid L.

In one embodiment, the liquid contact layer 101 is a waterproof insulator, such as glass, a printed circuit board (PCB), acrylic, a polycarbonate (PC), having a low dielectric coefficient.

The liquid contact layer 101 has a surface S1 contacting the liquid L, and the liquid contact layer 101 separates the liquid L to generate a space S2 that is dry. The projected capacitance unit 102 is disposed in the space S2. In other words, the liquid contact layer 101 divides this disclosure into a space with the liquid L and another space without the liquid L, or disables the projected capacitance unit 102 from directly contacting the liquid L, and the projected capacitance unit 102 contacts the liquid contact layer 101.

The projected capacitance unit 102 has a preset first capacitance value. When the liquid contact layer 101 changes a preset electric field of the projected capacitance unit 102 after contacting the liquid L, the first capacitance value of the projected capacitance unit 102 is changed to a second capacitance value. Consequently, the control device 103 calculates a liquid level height of the liquid L according to a change between the first capacitance value and the second capacitance value.)

Please note that, in the continuous liquid level sensing system 100A, the projected capacitance unit is disposed in a region where the liquid L is located, and the liquid contact layer 101 surrounds and covers the projected capacitance unit 102, so the liquid contact layer 101 isolates the liquid L from contacting the projected capacitance unit 102. In other words, the projected capacitance unit 102 is covered by the liquid contact layer 101, and the liquid contact layer 101 disables the projected capacitance unit 102 from directly contacting the liquid L. When the liquid L functions as a conductor contacting the liquid contact layer 101, the capacitance of the projected capacitance unit 102 changes, and the control device 103 calculates the liquid level height of the liquid L according to the capacitance change.

Figure 1C:
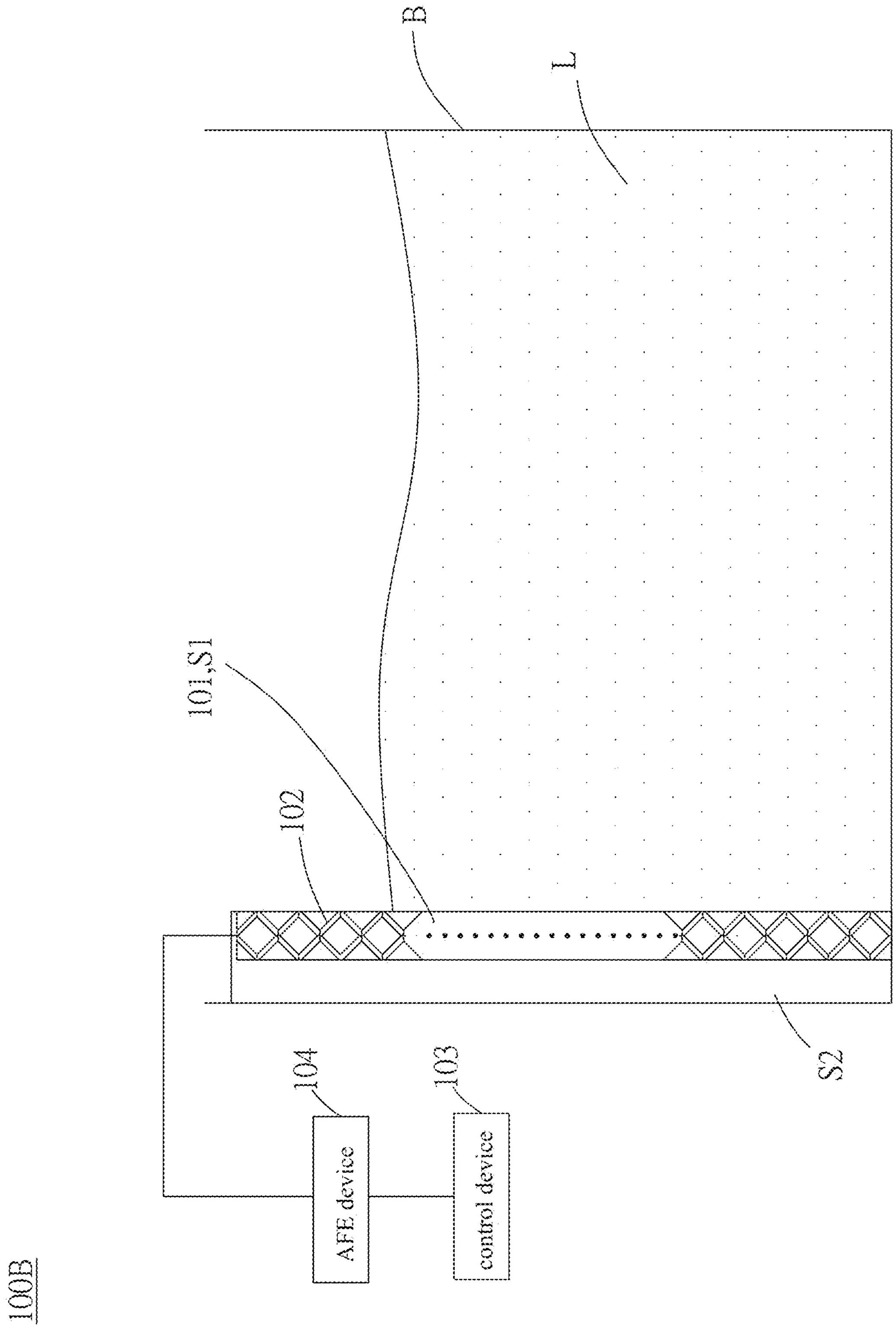
Figure 1D:
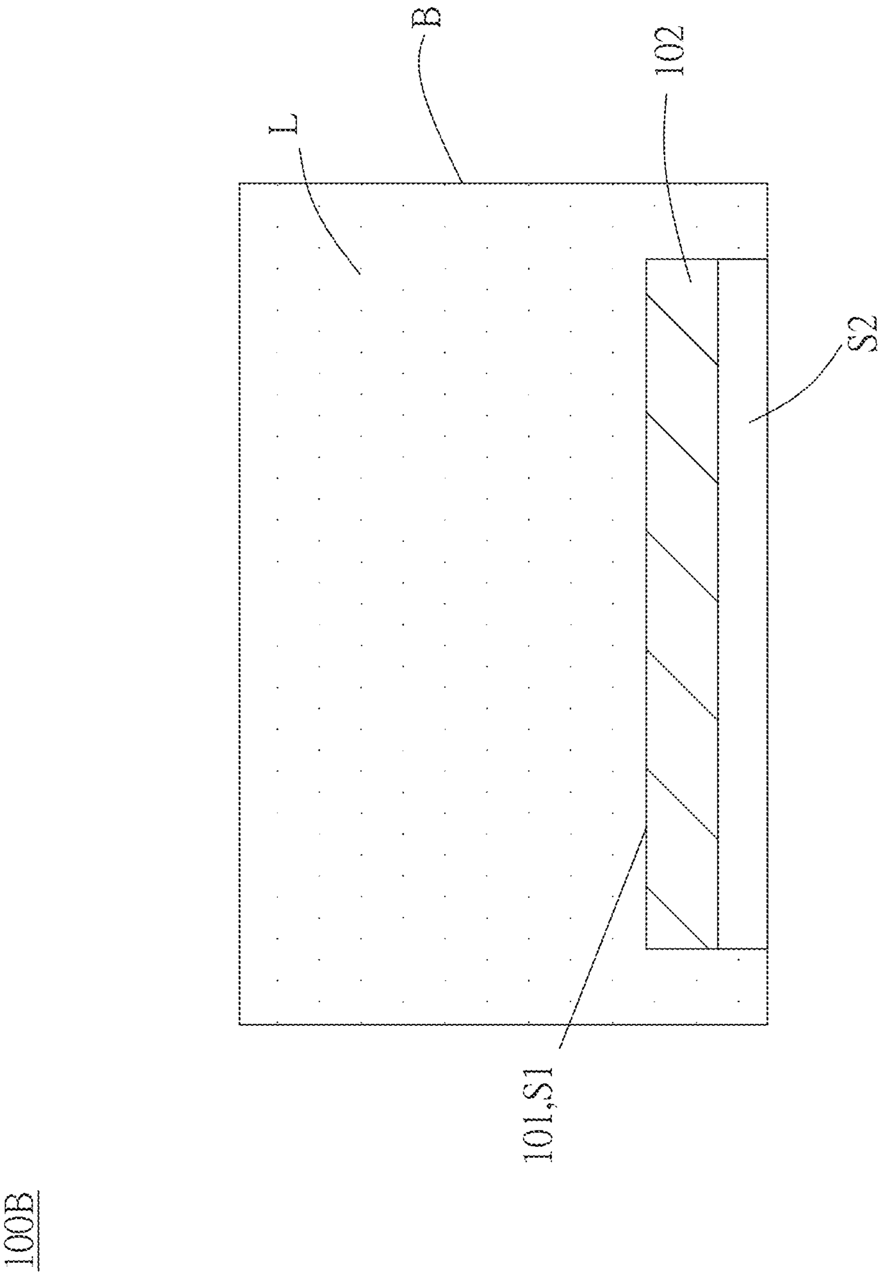

FIG. 1C is a schematic view showing an embodiment of this disclosure, and FIG. 1D shows a top view of FIG. 1C. Referring to FIGS. 1C and 1D, the difference between the continuous liquid level sensing systems 100B and 100A utilizing projected capacitance according to the embodiments of this disclosure resides in that the liquid contact layer 101 in the continuous liquid level sensing system 100B is disposed to contact an inner wall of the storage container B, and the projected capacitance unit 102 is disposed in the storage container B.

Figure 1E:
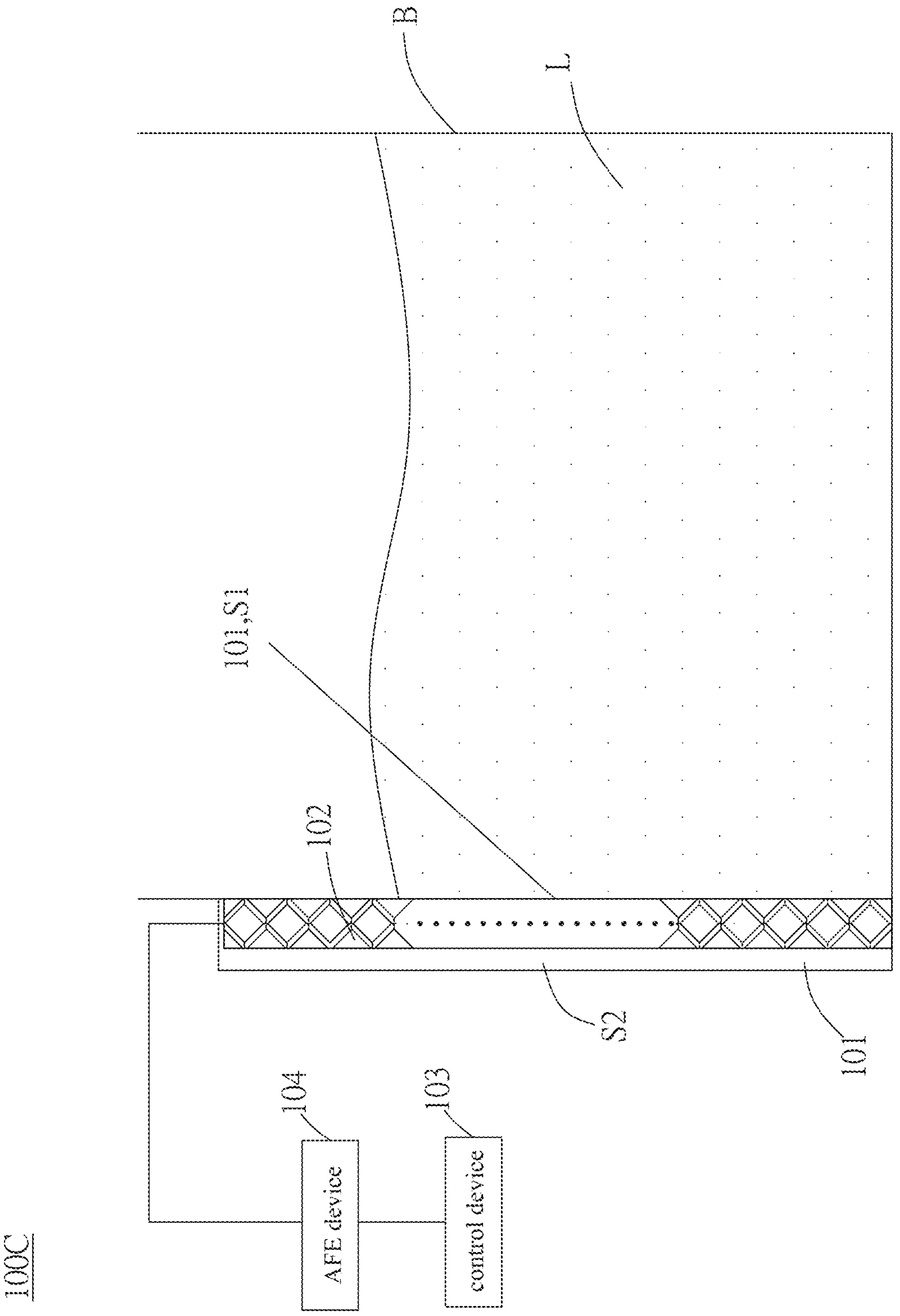
Figure 1F:
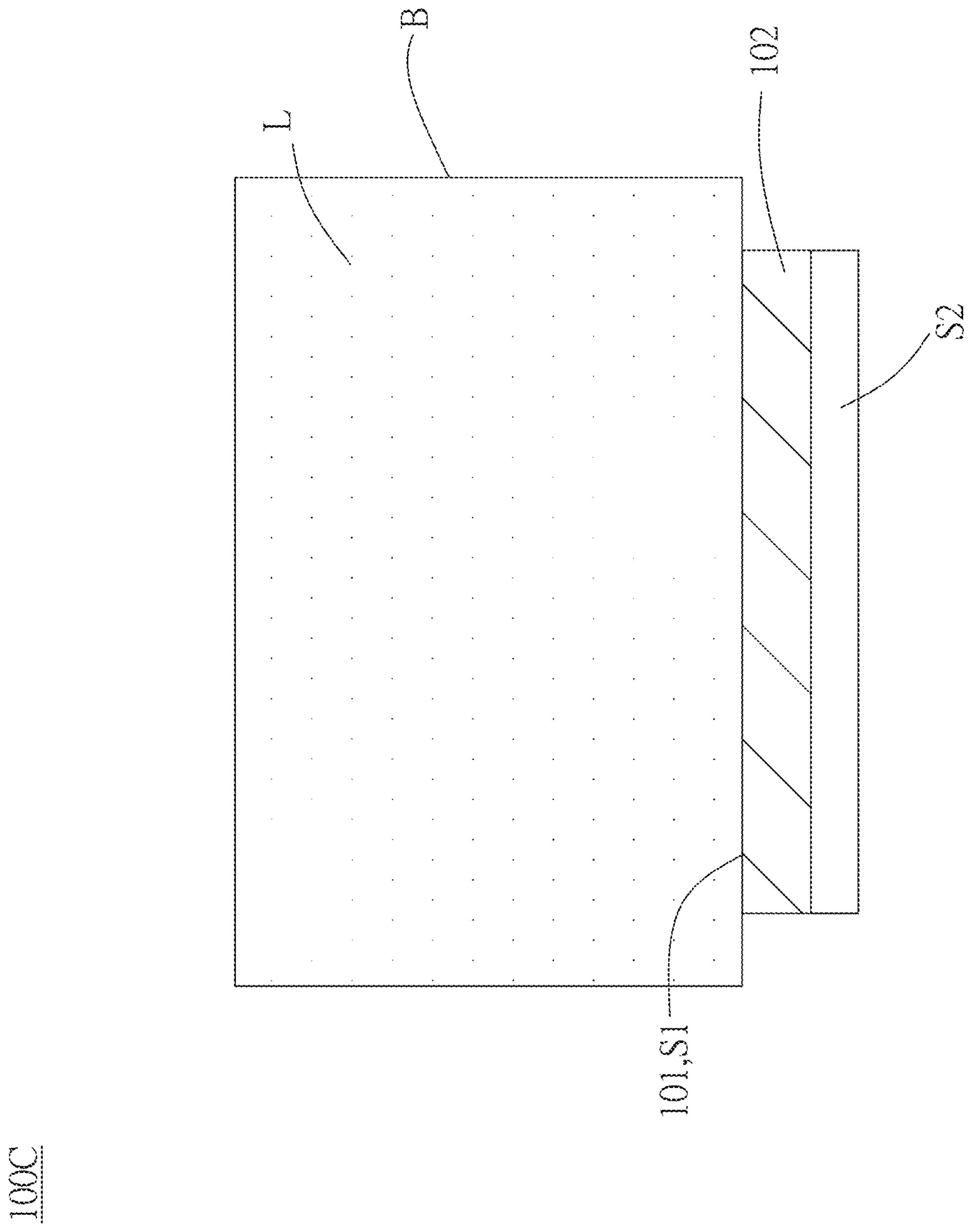

FIG. 1E is a schematic view showing an embodiment of this disclosure, and FIG. 1F shows a top view of FIG. 1E. Referring to FIGS. 1E and 1F, the difference between the continuous liquid level sensing systems 100C and 100A utilizing projected capacitance according to the embodiments of this disclosure resides in that the projected capacitance unit 102 is not disposed in a region where the liquid L is located, and the liquid contact layer 101 may function as a portion of the storage container B for accommodating the liquid L, or the liquid contact layer 101 is disposed to contact an outer wall of the storage container B.

Please note that the liquid contact layer 101 may function as a protection structure for protecting the projected capacitance unit 102 to avoid the abnormal function of the projected capacitance unit 102. In addition, the projected capacitance unit 102 needs to contact the liquid contact layer 101, but the projected capacitance unit 102 does not directly contact the liquid L.

Figure 2A:
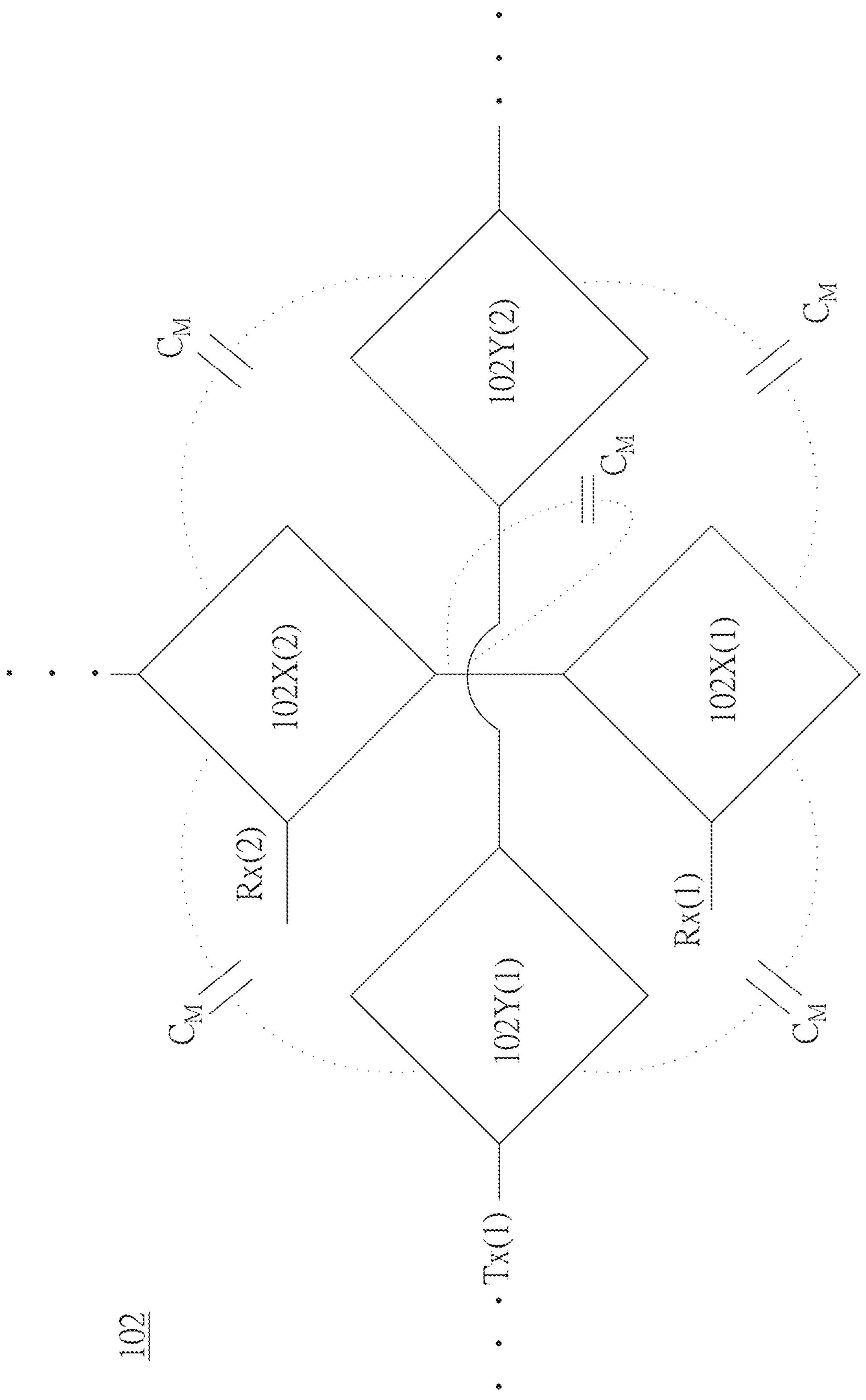
FIGS. 2A and 2B are schematic views showing a projected capacitance unit according to an embodiment of this disclosure.
Figure 2B:
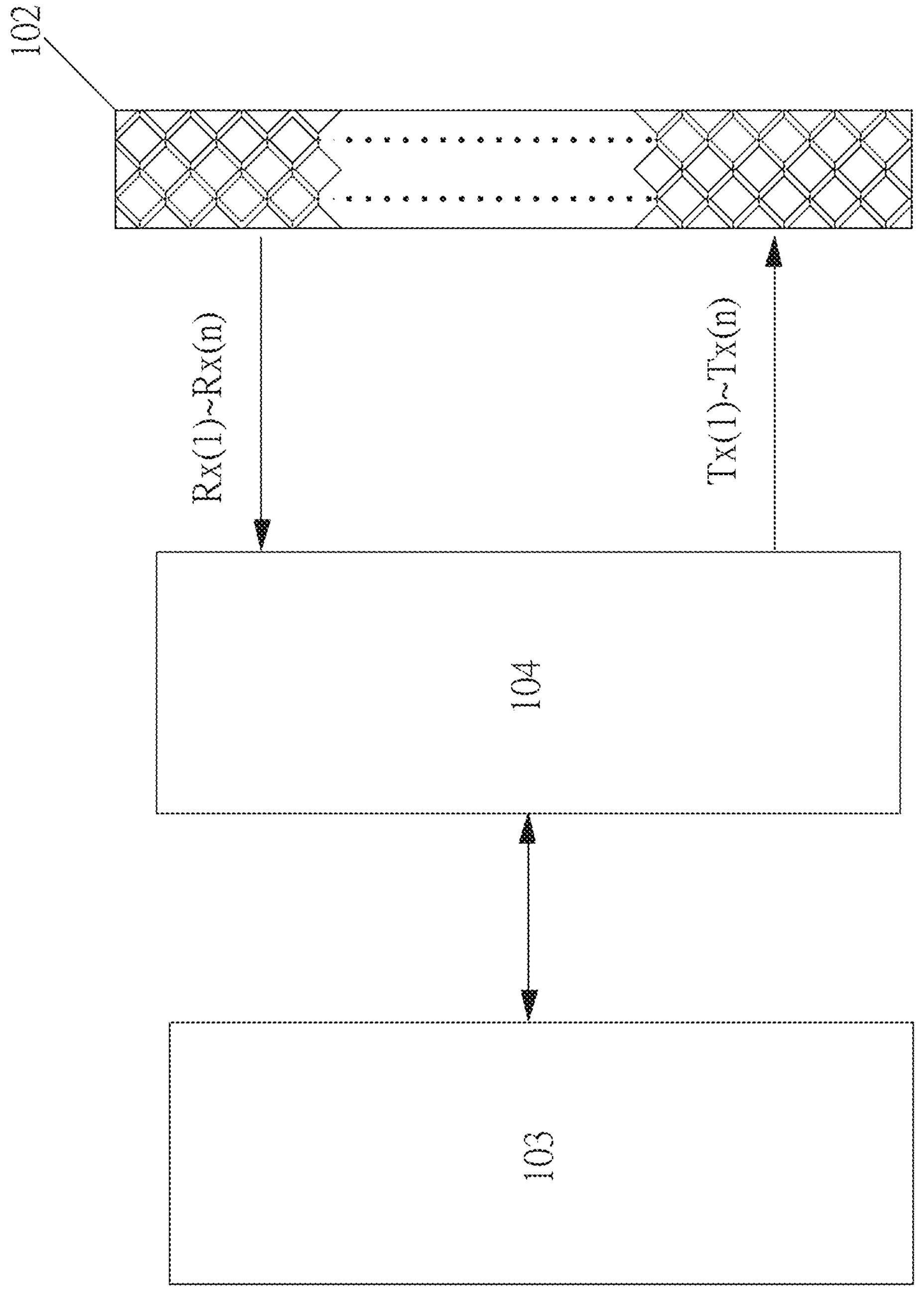

FIGS. 2A and 2B are schematic views showing a projected capacitance unit according to an embodiment of this disclosure. Referring to FIG. 2A, the projected capacitance unit 102 includes an array type Y-axis driving sensing line Tx(1) and array type X-axis receiving sensing lines Rx(1) and Rx(2). Please note that only some array units are depicted in the schematic view of FIG. 2A for the sake of conciseness.

The array type Y-axis driving sensing line Tx(1) is coupled to Y-axis electrodes 102Y, and the array type X-axis receiving sensing lines Rx(1) and Rx(2) are coupled to multiple X-axis electrodes 102X, wherein only two Y-axis electrodes 102Y(1) and 102Y(2) and two X-axis electrodes 102X(1) and 102X(2) are depicted in this drawing, but this disclosure should not be restricted thereto. The Y-axis electrodes 102Y(1) and 102Y(2) and the X-axis electrodes 102X(1) and 102X(2) are arranged in a staggered manner, and a connection line between the two adjacent Y-axis electrodes 102Y(1) and 102Y(2) crosses over a connection line between the two adjacent X-axis electrodes 102X(1) and 102X(2) without contacting. That is, the connection line between the adjacent X-axis electrodes 102X(1) and 102X (2) overpasses the connection line between the adjacent Y-axis electrodes 102Y(1) and 102Y(2), and the mutual capacitance between the Y-axis electrode 102Y and the X-axis electrode 102X has the first capacitance value CM.

Please note that the driving sensing line Tx is coupled to the Y-axis electrode 102Y, and the receiving sensing line Rx is coupled to the X-axis electrode 102X in this embodiment, but this disclosure should not be restricted thereto. In another example, the driving sensing line Tx may be coupled to the X-axis electrode 102X, and the receiving sensing line Rx may be coupled to the Y-axis electrode 102Y.

In one embodiment, the projected capacitance unit 102 of each unit includes the X-axis electrode 102X and the Y-axis electrode 102Y.

As mentioned hereinabove, each Y-axis electrode 102Y and one X-axis electrode 102X form a rectangular shape.

FIG. 2B is a schematic view showing a projected capacitance unit according to an embodiment of this disclosure. Referring to FIG. 2B, the AFE device 104 is coupled to multiple array type Y-axis driving sensing lines Tx(1) to Tx(n) and multiple array type X-axis receiving sensing lines Rx(1) to Rx(n), and the control device 103 sequentially transmits a driving signal to the array type Y-axis driving sensing lines Tx(1) to Tx(n), and continuously receives sensing signals from the array type X-axis receiving sensing lines Rx(1) to Rx(n) to continuously scan the liquid level height of the liquid. The control device 103 adjusts the driving signal such that the driving signal changes with time and has a non-stationary waveform, and the driving signal has a maximum signal-to-noise ratio in a unit time.

The control device 103 transmits the driving signal to the array type Y-axis driving sensing lines Tx(1) to Tx(n) to perform charging, and the array type X-axis receiving sensing lines Rx(1) to Rx(n) sense the array type Y-axis driving sensing lines Tx(1) to Tx(n) and generate sensing signals. At this time, the first capacitance value CM is present between the Y-axis electrode 102Y and the X-axis electrode 102X. When the liquid contact layer 101 and the liquid contact the projected capacitance unit 102 to perform discharging, the first capacitance value CM between the array type Y-axis driving sensing line Tx and the array type X-axis receiving sensing line Rx has changed to the second capacitance value, the sensing signal also correspondingly changes, and the control device 103 calculates the liquid level height of the liquid according to the change of the sensing signal.

In more detail, the control device 103 transmits the driving signal to the array type Y-axis driving sensing lines Tx(1) to Tx(n) to perform charging, and the array type X-axis receiving sensing lines Rx(1) to Rx(n) sense the array type Y-axis driving sensing lines Tx(1) to Tx(n) and generate the sensing signals. At this time, the Y-axis electrode 102Y and the X-axis electrode 102X form the first capacitance value CM. When the liquid contact layer 101 and the liquid contact the projected capacitance unit to perform discharging, the first capacitance value CM between the Y-axis electrode 102Y and the X-axis electrode 102X decreases to generate a change. In other words, the capacitance value between the Y-axis electrode 102Y and the X-axis electrode 102X has been changed to the second capacitance value (not shown) at this time. Because the first capacitance value CM differs from the second capacitance value, the control device 103 calculates the liquid level height of the liquid according to the change of the sensing signal.

Because the operation principle of the projected capacitance unit 102 is to form the X-axis and Y-axis electric fields under the liquid contact layer 101, the electric field power line passes through the surface of the liquid contact layer 101 to keep the electric fields balanced. Once the liquid approaches the liquid contact layer 101, the liquid and the X-axis electrode 102X or the Y-axis electrode 102Y form a new electric field, so that the local electrostatic capacitances between multiple electrodes concurrently change, and the control device 103 can precisely judge the position and the liquid level height by measuring the ratio between the charges.

Figure 3:
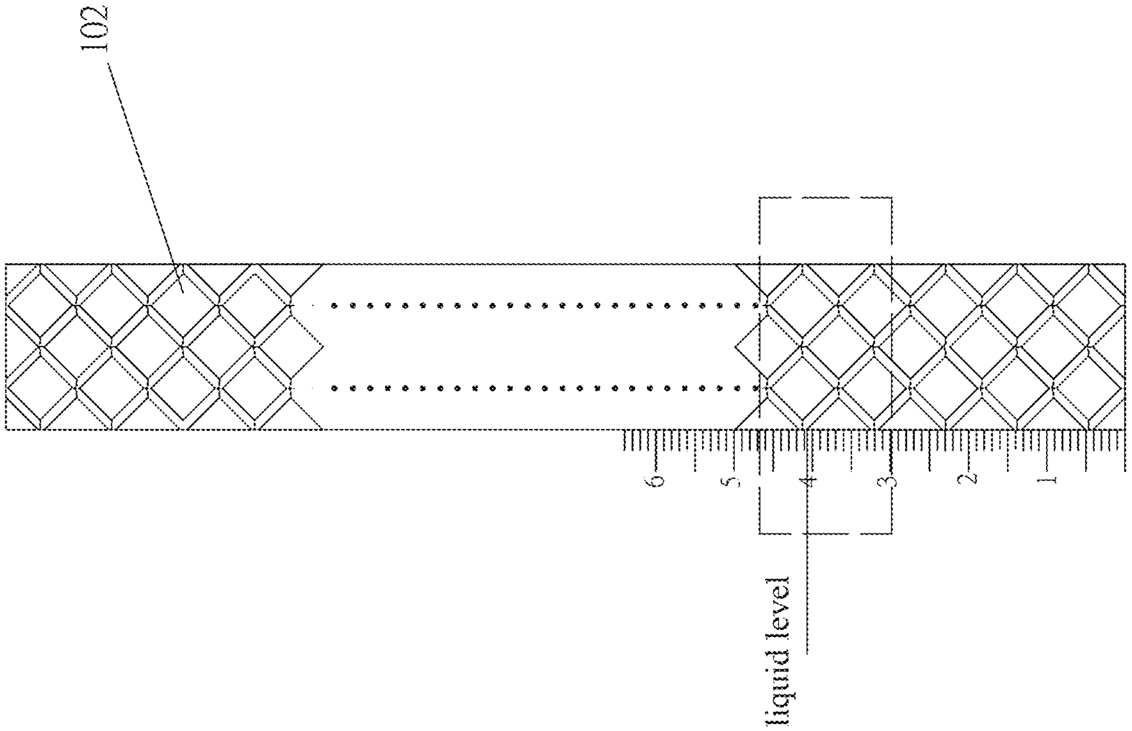
FIG. 3 shows a liquid level calculating method according to an embodiment of this disclosure.

FIG. 3 shows a liquid level calculating method according to an embodiment of this disclosure. Referring to FIG. 3, this disclosure can utilize the general hardware graduation (1 mm) as the visual liquid level height reference (see the left side), but digital calculations may also be performed according to the ratio of voltage or current changes of the projected capacitance unit 102, so that the stepless continuous measurement between the adjacent two electrodes (see the right side) can be achieved. In one embodiment, the interpolation can be performed to obtain the more precise liquid level height (e.g., 0.1 mm) than the actual hardware graduation (1 mm).

For example, if the liquid level is at the graduation of about 4 cm, then the capacitance change of the X-axis electrode 102X or Y-axis electrode 102Y near the liquid level (see the dashed box) changes the ratio between the currents (voltages) of the X-axis electrode 102X or Y-axis electrode 102Y, the AFE device 104 (not shown) obtains the corresponding digital signal, and then the liquid level sensing operation unit (not shown) in the control device 103 performs interpolation to obtain the more accurate liquid level height of 4.08 cm (see the graduation in the drawing).

Figure 4:
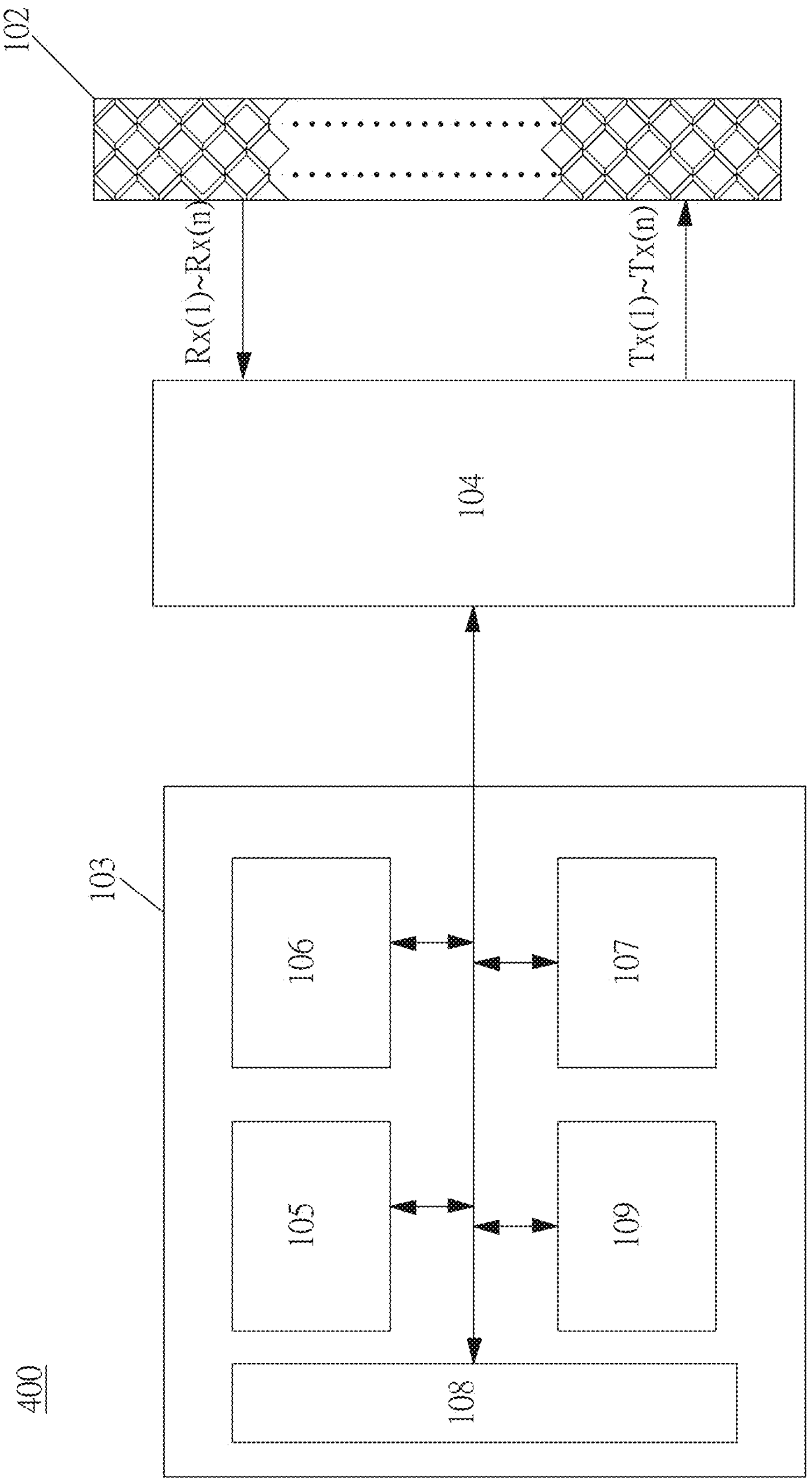
FIG. 4 is a schematic view showing an embodiment of this disclosure.

FIG. 4 is a schematic view showing an embodiment of this disclosure. Referring to FIG. 4, as previously mentioned, a continuous liquid level sensing system 400 utilizing projected capacitance further includes the AFE device 104, and the control device 103 further includes a central processing unit (CPU) 105, a liquid level sensing operation unit 106, a memory cell 107, a user interface 108 and a non-volatile memory cell 109.

The AFE device 104 is coupled to and disposed between the control device 103 and the projected capacitance unit 102. The AFE device 104 performs charging on the array type Y-axis driving sensing line Tx according to the control device 103, and converts the sensing signal of the array type X-axis receiving sensing line Rx into a digital signal outputted to the control device 103. The AFE device 104 converts the voltage or current change, generated by the difference between the first capacitance value and the second capacitance value, into the digital signal.

The CPU 105 generates the driving signal to measure the liquid level height. The liquid level sensing operation unit 106 calculates the liquid level height according to the digital signal coming from the AFE device 104, and outputs the liquid level height to the memory cell 107 for storage. The user interface 108 controls the CPU 105 to generate the driving signal to measure and monitor the liquid level height.

Please note that the non-volatile memory cell 109 prestores an initial reference value, and the continuous liquid level sensing system 100 firstly reads the reference value from the non-volatile memory cell 109 upon initial booting up. The AFE device 104 calibrates the projected capacitance unit 102 according to the reference value, and then the CPU 105 controls the liquid level sensing operation unit 106 to calculate the liquid level height according to the digital signal coming from the AFE device 104.

In one embodiment, the projected capacitance unit 102 is placed into each of three liquids having different liquid level standard heights (low/medium/high), such as the liquid levels of 10 cm, 30 cm and 50 cm, and then the liquid level sensing operation unit 106 calculates, according to the digital signal of the AFE device 104, an offset of the projected capacitance unit 102 as the reference value to be stored in the non-volatile memory cell 109.

Figure 5:
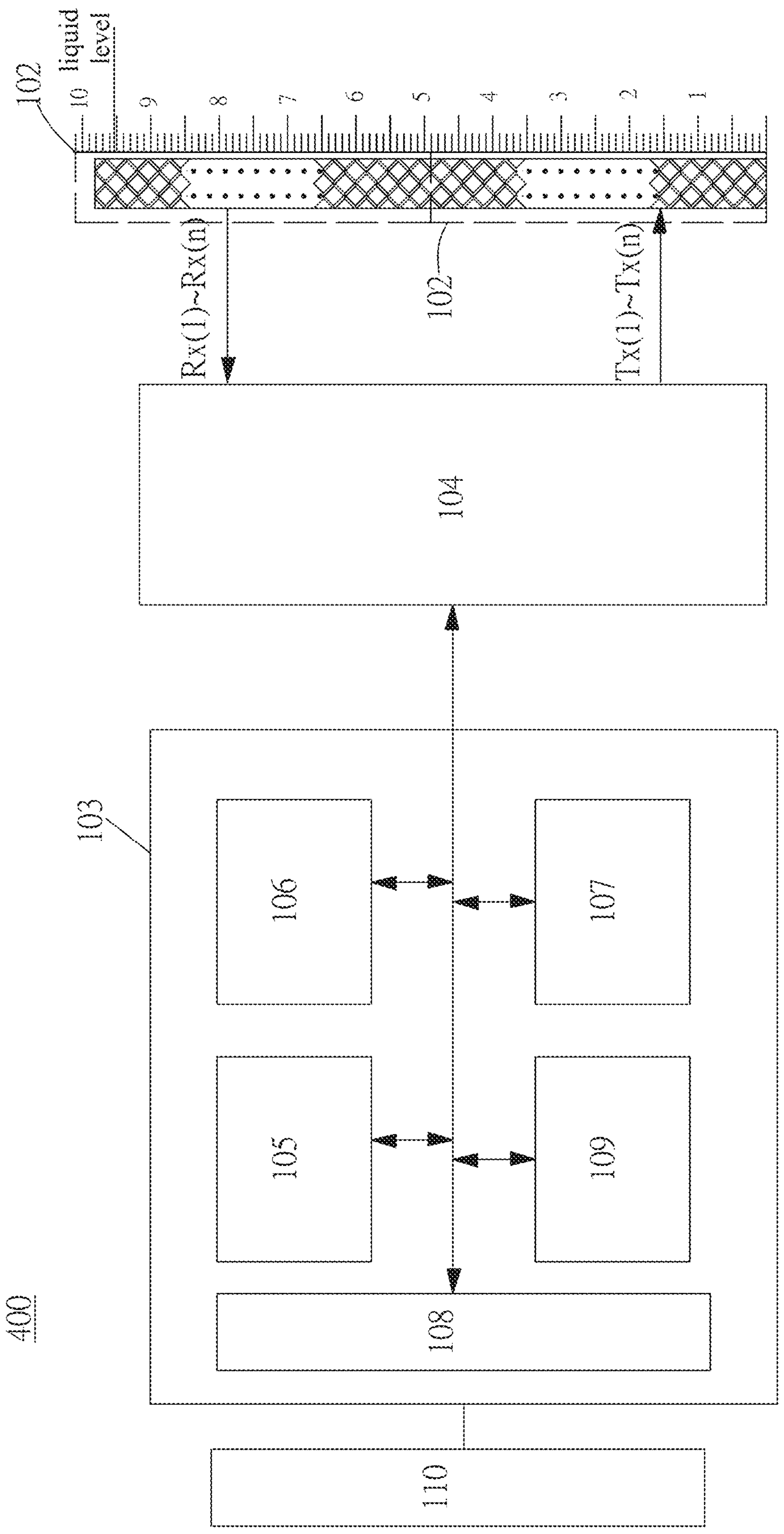
FIG. 5 is a schematic view showing that the projected capacitance units can be connected serially to perform expandable length measurement according to this disclosure.

FIG. 5 is a schematic view showing that the projected capacitance units can be connected serially to perform expandable length measurement according to this disclosure. Referring to FIG. 5, when the liquid level is higher, two projected capacitance units 102 are serially connected together through an inter-integrated circuit (I2C) bus, a serial peripheral interface (SPI) bus, or a universal serial bus (USB), and the user interface 108 and the host 110 perform communication to calculate the total height.

The calibration in this embodiment is the same as that mentioned hereinabove. Before the serial connection is established, the projected capacitance unit 102 is placed into each of three liquids having different liquid level standard heights (low/medium/high), such as the liquid levels of 10 cm, 30 cm and 50 cm, and then the liquid level sensing operation unit 106 calculates, according to the digital signal of the AFE device 104, the offset of the projected capacitance unit 102 to be stored in the non-volatile memory cell 109 and to be utilized for calibration upon initial booting up. After the serial connection has been established, the user respectively places the two serially connected projected capacitance units 102 into each of three liquids having different liquid level standard heights (low/medium/high), such as the liquid levels of 10 cm, 30 cm and 50 cm, and then judges whether the calculated liquid level height, obtained from the two serially connected projected capacitance units 102, falls within the average error specification value (e.g., 0.1%).

Figure 6:
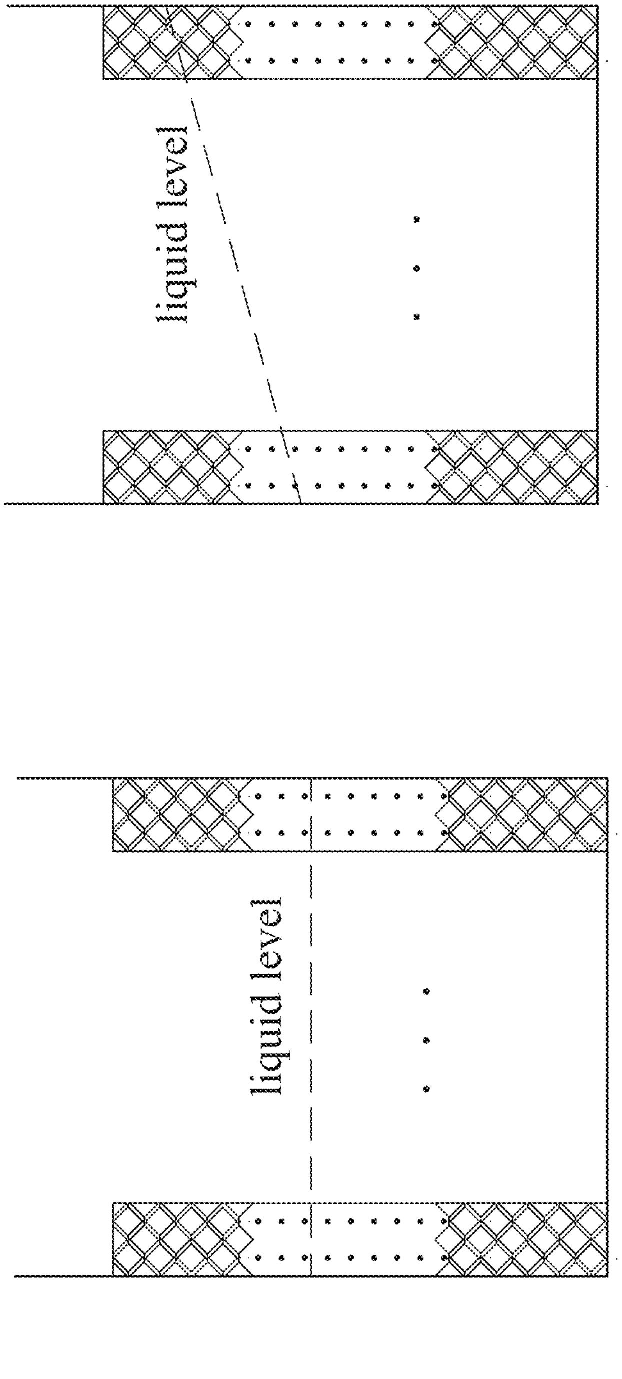
FIG. 6 is a schematic view showing the calculation for a tilted container.

FIG. 6 is a schematic view showing the calculation for a tilted container using multi-driving/multi-sensing. Referring to FIG. 6, the projected capacitance unit 102 covers the entire inner wall of the container, the projected capacitance unit 102 covers the entire outer wall of the container, or multiple projected capacitance units 102 are disposed in the container. When the container is not tilted, the projected capacitance units on two sides have the same liquid level height. When the container is tilted due to some reasons and the CPU generates the driving signal to measure the liquid level height, the tilted liquid level can be detected by the projected capacitance units on the two sides through the transmission of the driving signal, and then the liquid level sensing operation unit calculates the tilt angle and estimates the actual accurate liquid level height.

In summary, the continuous liquid level sensing system of this disclosure utilizes the circuit structure of the projected mutual capacitance. The projected mutual capacitance does not need the grounding in the region of measuring the liquid level, and the architecture thereof does not need the reference capacitor and resistor, so it can be disposed at any position of the liquid to perform the non-direct-contact sensing, and the damage caused by the circuit directly contacting the liquid can be further avoided. In addition, the more projected capacitance units can obtain the higher measurement accuracy and precision, and this disclosure has the architecture that the number of serially connected projected capacitance units can be increased, thereby enhancing the flexibility and sensitivity of measuring the liquid level.

The invention claimed is:

1. A continuous liquid level sensing system utilizing projected capacitance, the continuous liquid level sensing system comprising:

a liquid contact layer, which has at least one surface for contacting a liquid and separates the liquid to generate a space that is dry; and a projected capacitance unit, which is disposed in the space, has a first capacitance value that is preset, does not directly contact the liquid, and contacts the liquid contact layer; wherein when the liquid contact layer changes a preset electric field of the projected capacitance unit after contacting the liquid, the first capacitance value is changed to a second capacitance value; and a control device calculating a liquid level height of the liquid according to a change between the first capacitance value and the second capacitance value.

2. The system according to claim 1, wherein the projected capacitance unit is not disposed in a region where the liquid is located, and the liquid contact layer may function as a portion of a storage container for accommodating the liquid, or the liquid contact layer is disposed to contact an outer wall of the storage container.

3. The system according to claim 2, wherein the liquid contact layer is disposed on an inner wall of the storage container for accommodating the liquid, and the projected capacitance unit is disposed in the storage container.

4. The system according to claim 1, wherein the projected capacitance unit is disposed in a region where the liquid is located, the liquid contact layer surrounds and covers the projected capacitance unit, and blocks the liquid from contacting the projected capacitance unit, and the liquid contact layer is disposed on an inner portion of a storage container for accommodating the liquid.

5. The system according to claim 1, wherein the projected capacitance unit comprises:

an array type Y-axis driving sensing line coupled to multiple Y-axis electrodes; and an array type X-axis receiving sensing line coupled to multiple X-axis electrodes;

wherein the Y-axis electrodes and the X-axis electrodes are arranged in a staggered manner, a connection line between adjacent two of the Y-axis electrodes crosses over a connection line between adjacent two of the X-axis electrodes without contacting, and mutual capacitance between the Y-axis electrodes and the X-axis electrodes has the first capacitance value.

6. The system according to claim 5, wherein the connection line between the adjacent two of the X-axis electrodes overpasses the connection line between the adjacent two of the Y-axis electrodes.

7. The system according to claim 6, wherein the control device is coupled to the array type Y-axis driving sensing line and the array type X-axis receiving sensing line, and the control device sequentially transmits a driving signal to the array type Y-axis driving sensing line, and continuously receives a sensing signal from the array type X-axis receiving sensing line to continuously scan the liquid level height of the liquid;

wherein the control device adjusts the driving signal to make the driving signal change with time and have a non-stationary waveform, wherein the driving signal has a maximum signal-to-noise ratio in a unit time.

8. The system according to claim 7, wherein: when the control device transmits the driving signal to the array type Y-axis driving sensing line to perform charging, the array type X-axis receiving sensing line senses the array type Y-axis driving sensing line to generate the sensing signal, and the first capacitance value is present between the Y-axis electrodes and the X-axis electrodes; and when the liquid contact layer and the liquid contact the projected capacitance unit to perform discharging, the second capacitance value is present between the Y-axis electrodes and the X-axis electrodes, and the control device calculates the liquid level height of the liquid according to a change of the sensing signal.

9. The system according to claim 8, wherein the continuous liquid level sensing system comprises:

an analog front end (AFE) device, which performs charging on the array type Y-axis driving sensing line according to the control device, and converts the sensing signal of the array type X-axis receiving sensing line into a digital signal outputted to the control device;

wherein the AFE device converts a voltage change, generated by a difference between the first capacitance value and the second capacitance value, into the digital signal.

10. The system according to claim 9, wherein the control device comprises:

a central processing unit (CPU) generating the driving signal for measuring the liquid level height;

a liquid level sensing operation unit calculating the liquid level height according to the digital signal and outputting the liquid level height to a memory cell for storage;

a user interface controlling the CPU to generate the driving signal to measure or monitor the liquid level height; and a non-volatile memory cell pre-storing an initial reference value;

wherein the AFE device calibrates the projected capacitance unit according to the initial reference value, and the CPU controls the liquid level sensing operation unit to perform calculation, so that the liquid level sensing operation unit calculates the liquid level height according to the digital signal coming from the AFE device.

* * * * *